Aug. 13, 1963  KARL-AUGUST WÄCHTER  3,100,692
DETECTOR TUBE
Filed Feb. 16, 1961
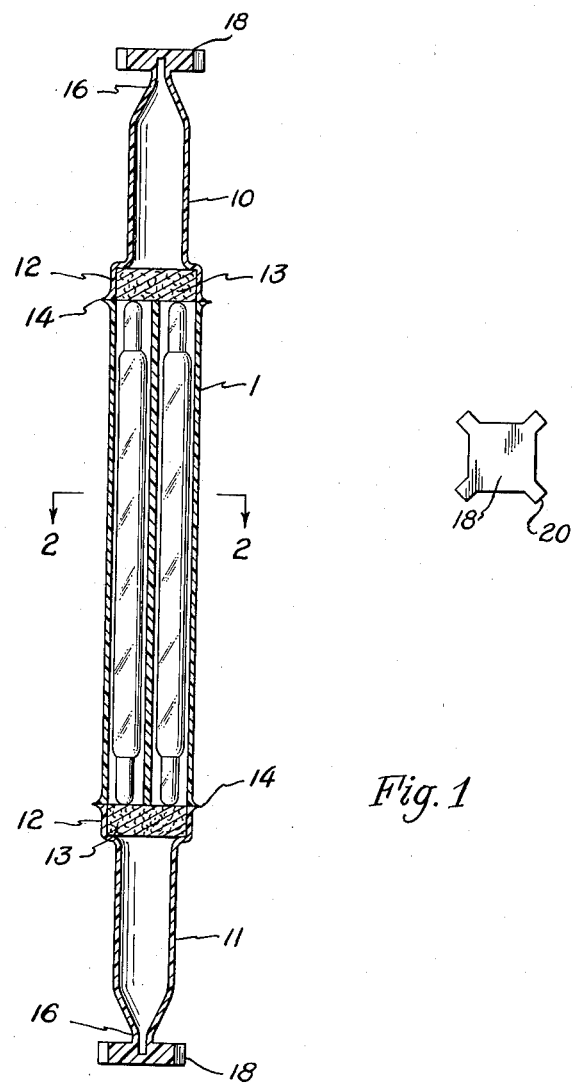
INVENTOR
Karl-August Wächter
BY Bailey, Stephens & Huettig
ATTORNEYS United States Patent Office 3,100,692
Patented Aug. 13, 1963

3,100,692
DETECTOR TUBE
Karl-August Wächter, Lubeck, Germany, assignor to
Otto Heinrich Drager, Lubeck, Germany
Filed Feb. 16, 1961, Ser. No. 89,743
5 Claims. (Cl. 23—254)

This invention relates to a detector tube for detecting impurities, such as poisonous gas, in air.

In the copending application of Carl Grosskopf Serial No. 74,264, filed December 7, 1960, now U.S. Patent 3,033,655, for "Tube for Detecting Impurities in Air," there is disclosed a detector tube which is partitioned into two or more adjacent chambers. In each chamber is positioned an ampoule containing a reagent for testing for a particular gas, and as a plurality of reagents are present, the detector tube can simultaneously test for the presence of several different gases in air. When the air is drawn through the detector tube, it is distributed into the separate chambers. The amount of air entering into the individual chambers can be assured by proper means. Consequently, the chambers can be formed so that the same amount of air can be drawn through each individual chamber.

This multiple chamber detector tube is preferably made out of a flexible material, such as a synthetic plastic. The material preferably is transparent so that the reaction within the chamber can be observed.

The reagent is placed within a breakable ampoule made, for example, of glass and the ampoules placed in the chambers in the flexible detector tube. Thus, when the flexible detector tube is bent, the glass ampoules are broken so that the reagent is discharged into its respective chamber and contactable by the gas drawn through the chamber.

Also, the ampoules containing the reagent can be covered with an absorptive material which may be in the form of a sleeve drawn over the ampoule. Such absorptive material is cotton, silica gel, or any other effective carrier which will absorb the reagent fluid so that the reagent can react with the gaseous components drawn in the chamber.

The object of this invention is to improve upon the aforesaid disclosure. In general, this invention consists of a detector tube middle section divided into several chambers and tip end sections at each end of the middle section. The sections are all made out of a synthetic material and joined together by welding the middle section to the tip end sections. This construction has the advantage of greatly facilitating the manufacture of the detector tube since the middle section can be easily filled with the ampoules or other reagent and afterwards the tip end sections can be welded to the middle section.

The means by which the objects of the invention are obtained are described more fully with reference to the accompanying drawings, in which:

FIGURE 1 is a longitudinal cross-sectional view through the detector tube of this invention;

FIGURE 2 is a cross-sectional view taken on the line 2—2 of FIGURE 1; and

FIGURE 3 is a plan view of FIGURE 1.

The open ended middle section 1 of the detector tube is divided into three chambers by partitions 2. Section 1 with partitions 2 is made by the injection molding or extrusion of synthetic material. Glass ampoules 5, 5' and 5" containing the reagents are placed in each chamber formed by partitions 2, respectively. As middle section 1, including partitions 2, is made out of flexible material, the glass ampoules in the three chambers can be broken when the middle section is bent. The tip end sections 10 and 11 each have a closed outer end and an open inner end and are also made out of synthetic plastic material. The open end of each tip end section has an enlarged portion 12 within which is inserted a plug or spacer 13 which is porous so as to permit the passage of the gases which are to be tested and which also serves to hold the ampoules 5 in place in the middle section.

The end edges of the middle section and the open end sections of the tip end sections are abutted and welded together. As shown, each of these edges has a transverse flange 14. These flanges are abutted and make it easier to weld or otherwise seal the joint.

In operation, the tips 16 of the tip end sections are broken off and the middle section 1 twisted in order to break the ampoules and release the reagents. Air is then drawn through the tube by any suitable means and the presence of contaminating gases indicated by a change in the reagents. The tip ends 16 are formed in one piece with integral knobs 18, these knobs covering the thin-walled tips 16. By twisting the knobs 18, the tips 16 are broken off. The operator can do this easily while wearing heavy-duty gloves. The twisting of the knobs 18 is made easier by giving the periphery of the knobs an irregular outline, as shown in FIGURE 3. The knob 18 has projecting corners 20 so that the knob can be grasped and twisted with a gloved hand. The irregular outline may be plural-sided or of any other irregular configuration.

Having now described the means by which the objects of the invention are obtained, I claim:

1. A detector tube for testing gases comprising an open ended middle section adapted to hold reagent material, a pair of tip end sections each having a closed tip end and an open end, the open end of each tip end section being joined, respectively, to the open end of said middle section, knob means formed in one piece with the closed end of each tip end section for twisting and breaking off the closed tips, and each section being composed of a synthetic plastic material.

2. A detector tube as in claim 1, further comprising a flange on the end edge of each section with the flange of each tip end section welded to the flange of the middle section.

3. A detector tube as in claim 2, further comprising a porous spacer inserted in the open end of each tip end section.

4. A detector tube as in claim 3, each tip end section having an enlarged open end portion containing said porous spacer.

5. A detector tube as in claim 4, said knob means having an irregular outline.

References Cited in the file of this patent

UNITED STATES PATENTS

| 2,487,077 | Shepherd | Nov. 8, 1949 |
| 2,908,555 | Grosskopf | Oct. 13, 1959 |
| 3,033,655 | Grosskopf | May 8, 1962 |

FOREIGN PATENTS

| 1,174,993 | France | Nov. 10, 1958 |